US 8,245,206 B2

(12) United States Patent
Lagergren et al.

(10) Patent No.: US 8,245,206 B2
(45) Date of Patent: Aug. 14, 2012

(54) SYSTEM AND METHOD FOR EFFICIENT STRING CONCATENATION IN A VIRTUAL MACHINE ENVIRONMENT

(75) Inventors: Marcus Lagergren, Stockholm (SE); Staffan Friberg, Stockholm (SE)

(73) Assignee: Oracle International Corporation, Redwood Shores, CA (US)

( * ) Notice: Subject to any disclaimer, the term of this patent is extended or adjusted under 35 U.S.C. 154(b) by 1218 days.

(21) Appl. No.: 11/954,745

(22) Filed: Dec. 12, 2007

(65) Prior Publication Data

US 2008/0147955 A1 Jun. 19, 2008

Related U.S. Application Data

(60) Provisional application No. 60/870,578, filed on Dec. 18, 2006.

(51) Int. Cl.
G06F 9/45 (2006.01)
(52) U.S. Cl. ........................................ 717/141
(58) Field of Classification Search .................. 717/141
See application file for complete search history.

(56) References Cited

U.S. PATENT DOCUMENTS

| 6,523,168 | B1 * | 2/2003 | Arnold et al. ............. 717/148 |
| 2005/0086520 | A1 * | 4/2005 | Dharmapurikar et al. .... 713/201 |
| 2005/0183077 | A1 * | 8/2005 | Langdale et al. .......... 717/148 |

OTHER PUBLICATIONS

Drayton, Peter; Albahari, Ben; Neward, Ted. C# in a nutshell a desktop quick reference, 2003, O'Reilly & Associates Inc, 2nd edition, pp. 18-21 and pp. 103-107.*
Wang, et al., "Temporal Management of RFID Data", 2005, p. 1128-1139, Proceedings of the 31$^{st}$ VLDB Conference.

* cited by examiner

Primary Examiner — Li Zhen
Assistant Examiner — Bradford Wheaton
(74) Attorney, Agent, or Firm — Fliesler Meyer LLP

(57) ABSTRACT

A system and method for efficient string concatenation in a virtual machine (VM), or other runtime environment, and particularly for use in a system that includes a Java Virtual Machine (JVM). An embodiment improves the performance of string concatenation significantly by analysing the string concatenation chains during bytecode compilation and replacing the dynamic string concatenation code with fixed size structures without bounds checks or locks. The resulting code is also more suitable for inlining.

18 Claims, 2 Drawing Sheets

SYSTEM AND METHOD FOR EFFICIENT STRING CONCATENATION IN A VIRTUAL MACHINE ENVIRONMENT

CLAIM OF PRIORITY

This application claims the benefit of U.S. Provisional Application No. 60/870,578, entitled "SYSTEM AND METHOD FOR EFFICIENT STRING CONCATENATION IN A VIRTUAL MACHINE ENVIRONMENT", filed Dec. 18, 2006, and herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to virtual machine environments and other runtime environments, and in particular to a system and method for improving string concatenation within such environments.

BACKGROUND

Virtual machines are complex software products that can be used to increase portability and stability of application software. Instead of compiling applications for a particular hardware platform, the applications are instead compiled for a virtual platform. A virtual machine tailored for a particular hardware platform then executes the applications compiled for the virtual machine. The virtual operations are, by tradition, referred to as "byte code". Java is a language that is compiled to byte code, and the resulting applications are then executed within the virtual machine, or in the particular case of Java, a Java Virtual Machine (JVM). Examples of such virtual machines include the Hotspot product from Sun Microsystems, Inc., and the JRockit product from BEA Systems, Inc. The Java byte code supports several built-in types for variables, for example: integers, floating point numbers, characters, bytes, booleans, pointers to objects, arrays of these types, and objects containing these types. The Java language also includes a large library of useful objects and functions referred to as the Java Development Kit (JDK). The JDK is written in Java, and the compiled library needs to be present both at application compile time and at runtime.

Java is often used for interactive web applications, which generate web pages by concatenating static strings with strings, and other values from database searches. A particular problem with string concatenation is that, using traditional methods, even a simple string concatenation results in a long chain of calls, wherein each call is dependent on the previous call. These calls are handled using an append feature. However, implementations of buffer append classes, wherein the final length is unknown, starts with a small buffer size that is then doubled each time the buffer is exhausted. For each of these doubling steps a memory copy of the full buffer has to take place. This means that a lot of processor (CPU) time is spent just copying the same information over and over again, which impacts the system's performance, and any applications that are running thereon. As such, any improvement to the JVM that increases its performance would also provide significant performance improvements for web applications. This is the area the invention is designed to address.

SUMMARY

Disclosed herein is a system and method for efficient string concatenation in a virtual machine (VM), or other runtime environment, and particularly for use in a system that includes a Java Virtual Machine (JVM). In particular, current techniques for string concatenation within JVMs are suboptimal. In accordance with an embodiment, a system and a method is provided to efficiently concatenate strings by reducing the number of times memory is copied, and allow for optimizations of the concatenation code. In accordance with an embodiment, the system provides for efficient string concatenation in a virtual machine environment, comprising: a virtual machine for executing a software application; a memory space for the software application bytecode; a bytecode compiler, comprising a string concatenation sequence detector and transformer; a memory space for the compiled application; a memory space for use by the virtual machine in storing software objects and pointers as part of the software application; a memory space for singleton strings; and a structure or logic for string concatenation of a fixed number of strings.

In accordance with another embodiment, each element of a chain of concatenations, that normally comprises at least two allocations and a function call including bounds checks, are reduced to a single function call with no bounds checks.

In accordance with another embodiment, a chain of concatenations is reduced to a single concatenation call with multiple arguments.

In accordance with another embodiment, the single concatenation functions are generated automatically by the compiler to adapt to the usage statistics of string concatenation within the application.

In accordance with another embodiment, the compiler decides on the basis of the compiled bytecode how large the fixed number of strings, that can be stored in the structure or logic for string concatenation, should be.

DETAILED DESCRIPTION

Figure 1:
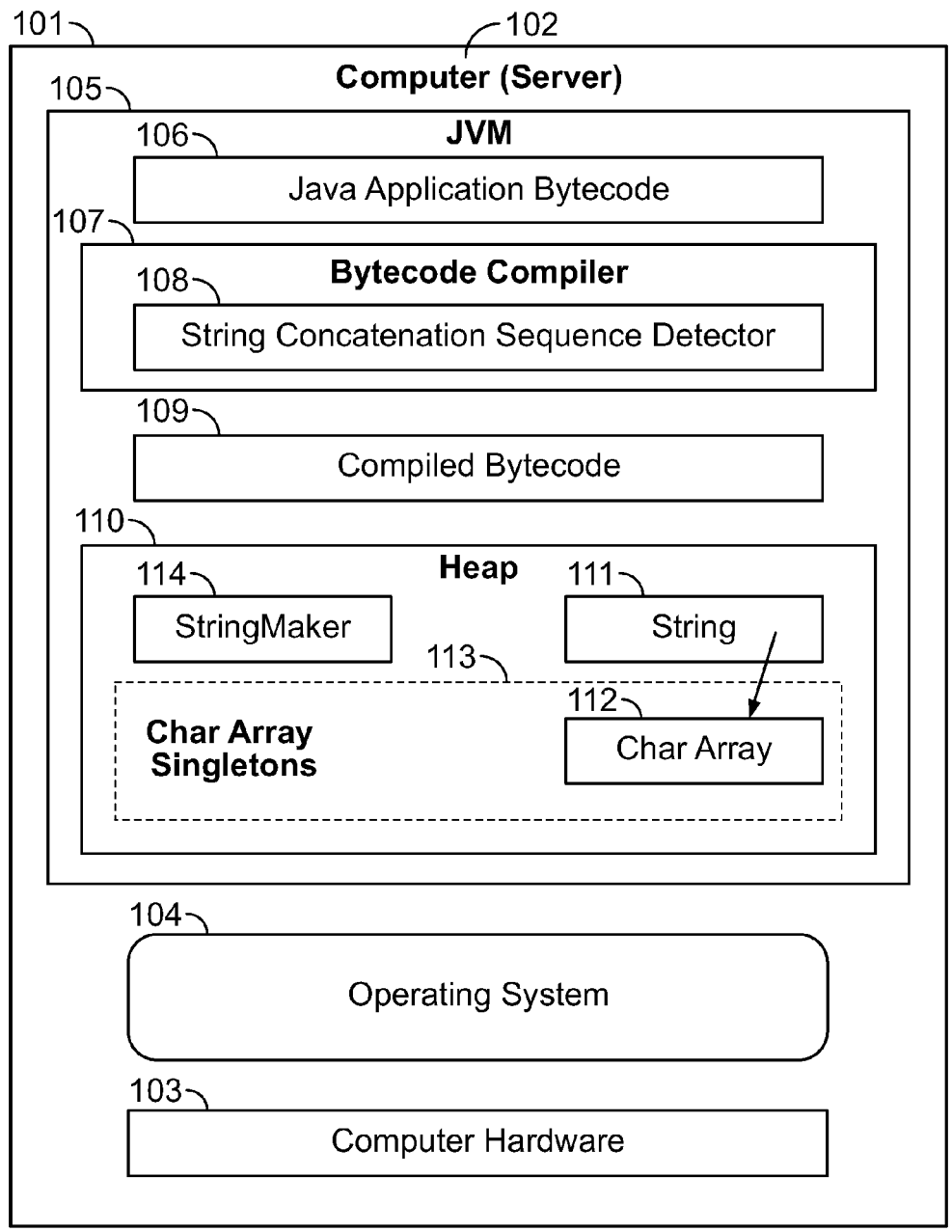
FIG. 1 shows an illustration of a system in accordance with an embodiment of the present invention that uses a compiler with a string concatenation detector to generate more efficient string concatenation code.

Disclosed herein is a system and method for efficient string concatenation in a virtual machine (VM), or other runtime environment, and particularly for use in a system that includes a Java Virtual Machine (JVM). In particular, current techniques for string concatenation within JVMs are suboptimal. Using traditional methods, even a simple string concatenation results in a long chain of calls, wherein each call is dependent on the previous call. These calls are handled using an append feature. However, implementations of buffer append classes, wherein the final length is unknown, starts with a small buffer size that is then doubled each time the buffer is exhausted. For each of these doubling steps a memory copy of the full buffer has to take place, which requires a lot of processor (CPU) time, and which impacts the system's performance, and any applications that are running thereon. An embodiment addresses this problem by providing a system and a method to efficiently concatenate strings by reducing the number of times memory is copied and allow for optimizations of the concatenation code.

Within the Java Development Kit (JDK), the "String" object does not have a built-in byte code representation. Instead, the String object is implemented using character arrays that are wrapped inside a Java object named "String", and the JDK contains the implementation of the String object. The JVM is instead only required to support a function named "intern". The intern function takes a character array as an argument, and returns a singleton for that unique sequence of characters. The intern function is used to guarantee that multiple instances of strings that have the same sequence of characters share the same character array.

String objects in Java are immutable. As a String object is created, the intern function is called to guarantee a reduced memory footprint if the unique sequence of characters has already been used. To create new Strings out of old Strings, the Java language contains a "+ operator" (i.e. a "plus" operator) for concatenating Strings. However the + operator is not implemented in bytecode, nor is it a fixed function in the Java libraries. It is instead syntactic sugar that is understood by the Java compiler (for example, the javac compiler). When the + operator is used, the compiler will identify the type of the object to be appended to the String, and insert suitable byte code for concatenation.

Traditionally the + operator has been implemented using a JDK construct referred to as StringBuffer (up to and including Java 1.4). As of Java 1.5, the javac compiler uses instead another construct referred to as StringBuilder, which is similar in design but provides better performance, since the old StringBuffer design used many unnecessary synchronizations. The following method is used as an example throughout this description:

---
Listing 1

```
public int hashCode( ){
    return (Sfield__a + Sfield__b + Ifield__c).hashCode( );
}
```
---

Wherein Sfield_a and Sfield_b are instance fields that are Strings, and Ifield_c is an instance field that is an int. The Java compiler translates the + operator shown above into byte code that is equivalent to the byte code generated from the following Java code:

---
Listing 2

```
StringBuilder tmp = new StringBuilder( );
tmp2 = tmp.append(Sfield__a);    // tmp2 == tmp
tmp3 = tmp2.append(Sfield__b);   // tmp3 == tmp2
tmp4 = tmp3.append(Ifield__c);   // tmp4 == tmp3
String str = tmp4.toString( );
return str.hashCode( );
```
---

The resulting byte code then looks as shown below:

---
Listing 3

```
0:   new            #2; //class java/lang/StringBuilder
3:   dup
4:   invokespecial  #3;
                    //Method java/lang/StringBuilder
                    ."<init>":( )V
7:   aload__0
8:   getfield       #4; //Field Sfield__a:Ljava/lang/String;
11:  invokevirtual  #5;
                    //Method java/lang/StringBuilder
                    .append:(Ljava/lang/String;)
                    Ljava/lang/StringBuilder;
14:  aload__0
15:  getfield       #6; //Field Sfield__b:Ljava/lang/String;
18:  invokevirtual  #5;
                    //Method java/lang/StringBuilder
                    .append:(Ljava/lang/String;)
                    Ljava/lang/StringBuilder;
21:  aload__0
22:  getfield       #7; //Field Ifield__c:I
25:  invokevirtual  #8;
                    //Method java/lang/StringBuilder
                    .append:(I)Ljava/lang/StringBuilder;
28:  invokevirtual  #9;
                    //Method java/lang/StringBuilder
                    .toString:( )Ljava/lang/String;
31:  invokevirtual  #10;
                    //Method java/lang/String.hashCode:( )I
34:  ireturn
```
---

The earlier Java 1.4 version would look exactly the same, except that it would use StringBuffer instead of StringBuilder. The progress of the byte code can be traced as follows:

0: allocate a new StringBuilder.
   4: call the StringBuilder constructor.
   11: call append on the StringBuilder with Sfield_a as the argument.
   15: append is called again with Sfield_b 22: append is called again with Ifield_c.
   28: an immutable String is created from the StringBuilder.
   31: the has Code for the String is calculated.

What seemed as first to be a simple string concatenation, actually turns out to be a long chain of calls, wherein each call is dependent on the previous call. In some JVM's, for example JRockit, the compiler inside the JVM assumes that parameters to calls escape from the function, and that the system can therefore not perform advanced compiler optimizations on these parameters. It is possible for systems such as the JRockit system to inline calls and to enable compiler optimizations on the parameters since they are no longer escaping (unless of course the inlined function itself makes other calls with the same values). However the append functions are not usually considered for inlining because they are not short enough, which means that string concatenation is not as optimized as it could be. Traditionally, implementations of buffer append classes, wherein the final length is unknown, starts with a small buffer size that is then doubled each time the buffer is exhausted. For each of these doubling steps a memory copy of the full buffer has to take place. As mentioned above, this means that a lot of processor (CPU) time is spent just copying the same information over and over again. Since Java is often used for interactive web applications, which generate web pages by concatenating static strings with strings, and other values from database searches, any improvement to the JVM that reduces the amount of copying and optimizes the concatenation code would provide significant performance improvements for web applications.

FIG. 1 shows an illustration of a system in accordance with an embodiment that uses a compiler with a string concatenation detector to generate more efficient string concatenation code. As shown in FIG. 1, the system 101 comprises a computer server 102 that further comprises a computer hardware 103. The computer hardware runs an operating system 104. A virtual machine such as a Java Virtual Machine 105 runs within the operating system. The JVM contains the application software as byte code 106. The bytecode is compiled using the bytecode compiler 107. The detector 108 detects any string concatenation chains, and the compiler transforms these into more efficient code. The resulting native code is stored in the memory space 109. When the application software is concatenating it makes use of the Java Heap 110, which contains String objects 111. The String objects refer to singleton instances of unique character arrays 112 stored as part of the char array singleton 113 memory space. In accordance with an embodiment, the system uses a StringMaker 114, which is an improved string concatenation structure or logic, described in further detail below.

Figure 2:
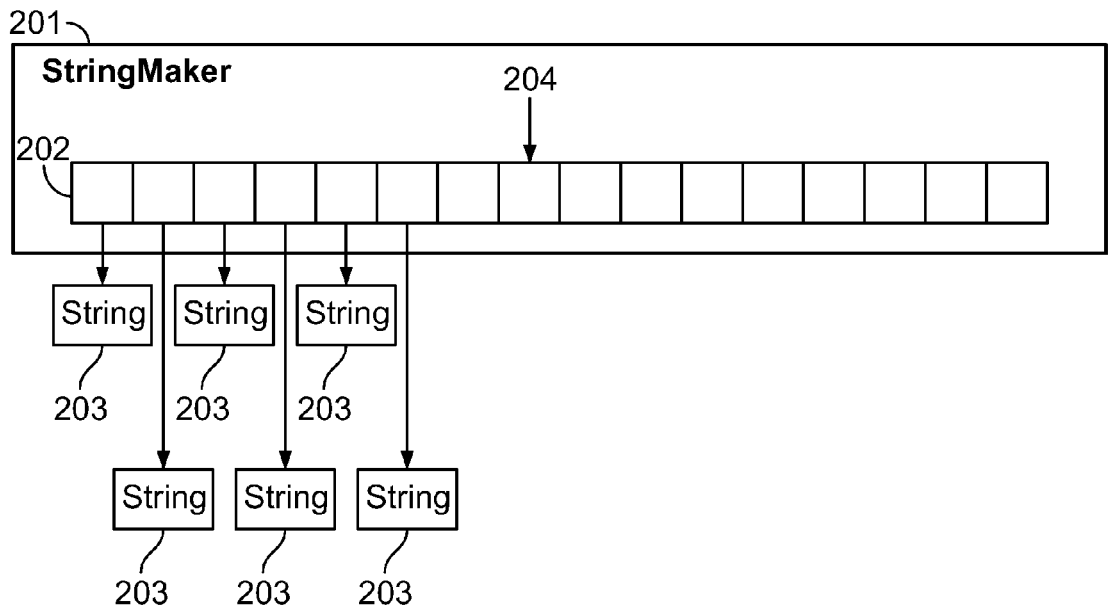
FIG. 2 shows a schematic of the memory layout in accordance with an embodiment of the present invention, for an improved string concatenation structure or logic.

FIG. 2 shows a schematic of the memory layout in accordance with an embodiment of the present invention, for an improved string concatenation structure or logic. As shown in FIG. 2, the string concatenation structure or logic is referred to as a StringMaker 201. In accordance with an embodiment the StringMaker contains a fixed array 202 with pointers to the string objects 203 that are to be concatenated. In accordance with an embodiment, the maximum capacity of the array is set as 16 elements. The traditional StringBuilder append operation needs to verify the capacity of the char array inside the StringBuilder, and if necessary it has to allocate a larger char array and copy the contents of the original array into the new larger array. In contrast, the StringMaker only needs to store a pointer to the appended string in the next available position 204 in the fixed array. No bounds checking is needed, because the compiler guarantees that the StringMaker will only be used in situations where at most 16 strings need to be concatenated. In accordance with an embodiment the value of 16 was selected by profiling common Java applications; in accordance with other embodiments a different value could be used.

In accordance with an embodiment the StringMaker does not have an internal character array. Its purpose is to remember the string objects, until it is time to create a new string using the tostring method on the StringMaker. When the tostring method is called, it iterates through all strings pointed to from 202, and sums the length of the strings. This is only possible because Java Strings are immutable; there is no risk that the strings will change between the append and the later concatenation. A single allocation for the new concatenated string is then performed and the contents of the strings are copied into the new string. The StringMaker does not need any locking because the compiler will only insert StringMakers in string concatenation chains that have certain properties, described in further below. The StringMaker therefore reduces the overhead of string concatenation significantly.

Figure 3:
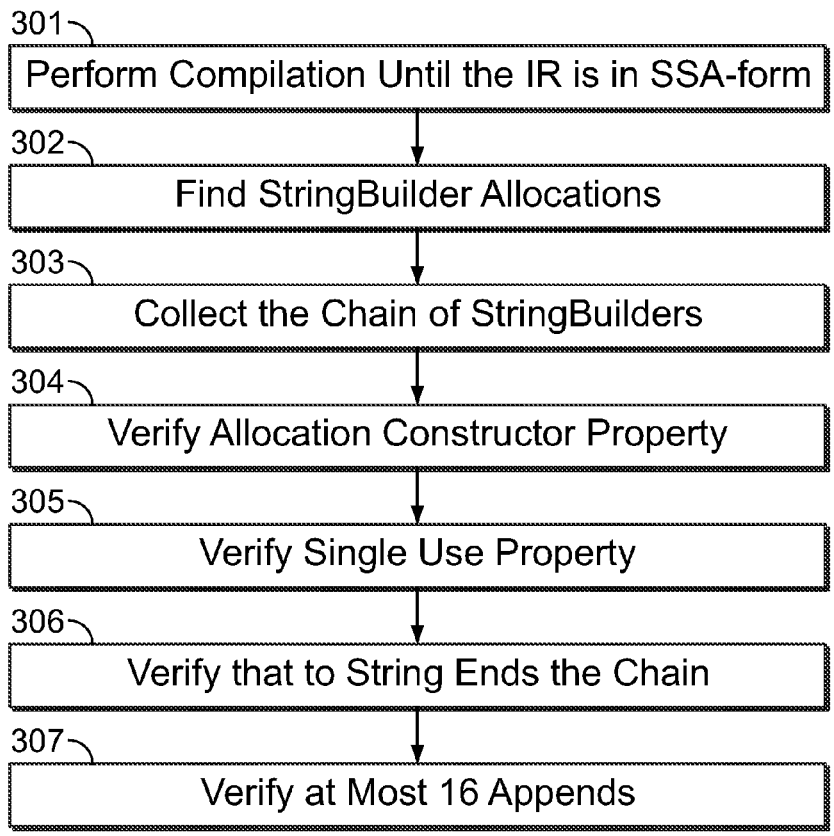
FIG. 3 shows a flowchart in accordance with an embodiment of the invention that illustrates the detection of string concatenation chains.

FIG. 3 shows a flowchart in accordance with an embodiment, that illustrates the detection process of string concatenation chains. As shown in FIG. 3, the process begins at step 301 by putting the intermediate representation of the bytecode into single static assignment (SSA) form. Next, at step 302, an allocation site of a StringBuilder within a limited scope is detected. A suitable limited scope is a basic block within a Java function. In step 303, the compiler collects a chain using the starting point gathered in the previous step, and using the properties of the SSA-form. At step 304, the compiler has to verify that, after each StringBuilder allocation, there is exactly one call to its constructor. In step 305, the append chain consists of a number of appends that all return a new StringBuilder which is used only in one append, or (in step 306) a toString, which is considered the end of the chain. Aliasing are permitted, such as moving a variable to another as part of the chain, but joins are not allowed. Finally, in accordance with an embodiment that uses a 16 element array, if the chain uses more than 16 appends, it is ignored.

In another embodiment of the invention, the compiler can replace the fixed size array of 16 elements with a StringMaker constructor that initiates the array to a proper size that will then encompass the chain size.

The public API of StringBuilder and StringBuffers specifies that their arguments do not escape, so that when a chain has been found that have the properties above, it follows that none of its elements escape, except for the last toString result. In this instance there are no side effects and it will not need synchronization. It is therefore safe to perform the string concatenation in any other way or order, as long as the result is the same.

Embodiments of the present invention can therefore be used to replace the StringBuilder allocation and method calls with corresponding StringMaker allocation and calls. The resulting code will be identical to listing 2, except that StringBuilder is replaced with StringMaker. The StringMaker methods are much shorter than their StringBuilder counterparts, and can be so because the compiler has already statically performed the bounds checks and locking verification as described above. As a result the string concatenation uses a minimal amount of copying and allocation, and the append calls are small enough to be inlined for even higher performance.

Collapsing the Concatenation Chain and Keeping the Semantics

In accordance with an embodiment, it is possible to improve the performance even more by collapsing the concatenation chain. In accordance with one embodiment this is performed by replacing a chain of append calls into a single call to a function with multiple arguments. This is beneficial because, even though the append performance is significantly improved, there is still the call overhead for each append. If, for example, we have three appends in a row, taking a string, a string and an int respectively as in listing 2 above, it can be replaced with a single call append(String, String, int). Thus, listing 2 can then be turned into:

---
Listing 4

StringMaker tmp = new StringMaker( );
tmp2 = tmp.appendSSI(Sfield_a, Sfield_b, Ifield_c);// tmp2 == tmp
String str = tmp2.toString( );
return str.hashCode( );

---

It is not likely that one would want to create append variations for all possible append situations in advance. Profiling of common Java applications indicates that if the 10 most common combinations of length 3 are created in advance, then this will give a measurable performance improvement. In accordance with an embodiment, a detection algorithm first tries to look up customized append functions by synthesizing descriptors from the detected append chain. It starts with the longest possible descriptor, and gradually decreases the number of arguments until an appropriate StringMaker-append can be found. If no pre-created append variation is found, then it reduces to the original append methods in StringBuilder, now reimplemented by StringMaker.

In accordance with another embodiment, the system uses the virtual machine to perform a runtime analysis of the concatenation chains that are used in the application, and automatically generate the optimal combination of append functions for a particular application. For example, if an application often executes an append chain that takes two strings, one float, and one int in that order, then an embodiment can generate an append(String, String, float, int) function to improve performance.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a WebLogic or JRockit environment, other application servers, virtual machines, JVMs, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for string concatenation in a virtual machine environment, comprising:
    a computer including a microprocessor;
    a virtual machine on the computer, for executing a software application, wherein the software application includes one or more operations for concatenating strings;
    a memory space for storing the software application as bytecode;
    a string concatenation structure provided as a fixed array having a maximum capacity associated therewith, for use by the virtual machine in concatenating the strings; and
    a bytecode compiler, comprising a string concatenation sequence detector, wherein the bytecode compiler detects, within the software application, the operations for concatenating strings, and
    creates, within the fixed array, pointers to string objects that are to be concatenated, including storing each pointer in a next available position within the fixed array,
    determines that a new concatenated string should be created that includes the strings to be concatenated,
    iterates through the pointers in the fixed array, and sums the length of those strings pointed thereto,
    allocates a single allocation for the new concatenated string, and
    copies the contents of those strings pointed to by the pointers in the fixed array, to the new concatenated string;
    wherein the bytecode compiler selectively reduces chains of concatenation calls, by
        detecting during compilation of the software application one or more chains of concatenation calls
        synthesizing descriptors from a detected chain, starting with a longest possible descriptor, and gradually decreasing a number of arguments until an appropriate append function can be determined, and
        replacing the chain of concatenation calls with a single concatenation call including the determined append function.

2. The system of claim 1, wherein the string concatenation structure is a StringMaker.

3. The system of claim 2, wherein the StringMaker comprises the fixed array with pointers to string objects that are to be concatenated.

4. The system of claim 3, wherein the maximum capacity of the fixed array is set as 16 elements.

5. The system of claim 4, wherein the system is used to create one or more appended strings, and wherein the StringMaker stores a pointer to the appended string in the next available position in the fixed array, for use in concatenating the strings.

6. The system of claim 1, wherein each element of the chain of concatenations, that normally comprises at least two allocations and a function call including bounds checks, are reduced to a single function call with no bounds checks.

7. The system of claim 1, wherein the chain of concatenations is reduced to a single concatenation call with multiple arguments.

8. The system of claim 7, wherein the append functions are generated automatically by the compiler to adapt to the usage statistics of string concatenation within the application.

9. The system of claim 1, wherein the compiler decides on the basis of the compiled bytecode how large the fixed number of strings, that can be stored in the structure for string concatenation, should be.

10. A method of providing string concatenation in a virtual machine environment, comprising:
    providing, on a computer including a microprocessor, a virtual machine for executing a software application, wherein the software application includes one or more operations for concatenating strings;
    providing a memory space for storing the software application as bytecode;
    providing a bytecode compiler, comprising a string concatenation sequence detector, wherein the bytecode compiler detects, within the software application, the operations for concatenating strings, and
    creates, within a string concatenation structure provided as a fixed array having a maximum capacity associated therewith, pointers to string objects that are to be concatenated, including storing each pointer in a next available position within the fixed array, determines that a new concatenated string should be created that includes the strings to be concatenated, iterates through the pointers in the fixed array, and sums the length of those strings pointed thereto, allocates a single allocation for the new concatenated string, and copies the contents of those strings pointed to by the pointers in the fixed array, to the new concatenated string; and selectively reducing chains of concatenation calls, by detecting during compilation of the software application one or more chains of concatenation calls, synthesizing descriptors from a detected chain, starting with a longest possible descriptor, and gradually decreasing a number of arguments until an appropriate append function can be determined, and replacing the chain of concatenation calls with a single concatenation call including the determined append function.

11. The method of claim 10, wherein the string concatenation structure is a StringMaker.

12. The method of claim 11, wherein the StringMaker comprises the fixed array with pointers to string objects that are to be concatenated.

13. The method of claim 12, wherein the maximum capacity of the fixed array is set as 16 elements.

14. The method of claim 13, wherein the system is used to create one or more appended strings, and wherein the StringMaker stores a pointer to the appended string in the next available position in the fixed array, for use in concatenating the strings.

15. The method of claim 10, wherein each element of the chain of concatenations, that normally comprises at least two allocations and a function call including bounds checks, are reduced to a single function call with no bounds checks.

16. The method of claim 10, wherein the chain of concatenations is reduced to a single concatenation call with multiple arguments.

17. The method of claim 16, wherein the append functions are generated automatically by the compiler to adapt to the usage statistics of string concatenation within the application.

18. The method of claim 10, wherein the compiler decides on the basis of the compiled bytecode how large the fixed number of strings, that can be stored in the structure for string concatenation, should be.

* * * * *

UNITED STATES PATENT AND TRADEMARK OFFICE
CERTIFICATE OF CORRECTION

PATENT NO. : 8,245,206 B2
APPLICATION NO. : 11/954745
DATED : August 14, 2012
INVENTOR(S) : Lagergren et al.

Page 1 of 1

It is certified that error appears in the above-identified patent and that said Letters Patent is hereby corrected as shown below:

In column 5, line 45, delete "tostring" and insert -- toString --, therefor.

In column 5, line 46, delete "tostring" and insert -- toString --, therefor.

Signed and Sealed this
Sixth Day of November, 2012

David J. Kappos
*Director of the United States Patent and Trademark Office*